United States Patent [19]
Wilhoit et al.

[11] Patent Number: 5,304,385
[45] Date of Patent: Apr. 19, 1994

[54] METHOD FOR MAKING A COOKED FOOD USING SHIRRED CASING HAVING AN ETHYLENIC POLYMER OUTER LAYER WITH AN EXTERNAL NON-OIL BASED LUBRICANT

[75] Inventors: Darrel L. Wilhoit, Plainfield; Jeffery A. Oxley, Naperville, both of Ill.

[73] Assignee: Viskase Corporation, Chicago, Ill.

[21] Appl. No.: 76,888

[22] Filed: Jun. 15, 1993

Related U.S. Application Data

[62] Division of Ser. No. 584,563, Sep. 18, 1990, Pat. No. 5,256,458.

[51] Int. Cl.$^5$ ............... A22C 11/00; A22C 13/00; A23L 1/317; B65B 29/08
[52] U.S. Cl. .................. 426/412; 426/415; 426/129; 426/105; 426/135
[58] Field of Search .......... 426/105, 135, 129, 412, 426/415; 138/118.1; 428/34.8, 34.9, 500, 518, 522, 476.3; 206/802; 542/21

[56] References Cited

U.S. PATENT DOCUMENTS

| Re. 30,390 | 9/1980 | Kupcikevicius et al. | 17/49 |
|---|---|---|---|
| 3,222,192 | 12/1965 | Arnold et al. | |
| 3,262,789 | 7/1966 | Broumand et al. | |
| 3,451,827 | 6/1969 | Bridgeford | |
| 3,456,044 | 7/1969 | Pahlke | 264/25 |
| 3,594,856 | 7/1971 | Michl | 17/42 |
| 3,748,690 | 7/1973 | Niedecker | 17/33 |
| 3,981,046 | 9/1976 | Chiu | 17/49 |
| 4,164,057 | 8/1979 | Frey et al. | 17/49 |
| 4,169,163 | 9/1979 | Judd et al. | 426/413 |
| 4,325,850 | 4/1982 | Mueller | 524/228 |
| 4,529,634 | 7/1985 | Hammer et al. | 138/118.1 |
| 4,649,602 | 3/1987 | Kupcikevicius | 17/49 |
| 4,649,961 | 3/1987 | McAllister et al. | 138/118.1 |
| 4,666,750 | 5/1987 | Hammer et al. | 428/34.8 |
| 4,683,617 | 8/1987 | Raudys | 17/41 |
| 4,686,148 | 8/1987 | Havens | 428/520 |
| 4,698,111 | 10/1987 | Havens | 156/244.11 |
| 4,729,410 | 3/1988 | Inagaki | 428/34.8 |
| 4,766,713 | 8/1988 | Evans | 53/138 A |
| 4,784,863 | 11/1988 | Lustig et al. | 426/113 |
| 4,812,319 | 3/1989 | Hsu et al. | 426/127 |
| 4,833,024 | 5/1989 | Mueller | 428/349 |
| 4,844,129 | 7/1989 | Bridgeford et al. | 138/118.1 |
| 4,897,295 | 1/1990 | Erk et al. | 428/34.8 |
| 4,967,798 | 11/1990 | Hammer et al. | 138/118.1 |
| 5,047,253 | 9/1991 | Juhl et al. | 138/118.1 |
| 5,230,933 | 7/1993 | Apfeld et al. | 426/105 |

FOREIGN PATENT DOCUMENTS

| 862042 | 1/1971 | Canada . |
| 0289967 | 11/1988 | European Pat. Off. . |
| 0308106 | 3/1989 | European Pat. Off. . |
| 2002953 | 10/1969 | France . |
| 2184297 | 12/1973 | France . |
| 2464651 | 3/1981 | France . |
| 2578152 | 9/1986 | France . |
| 55141 | 3/1984 | Japan . |
| 484028 | 2/1980 | Spain . |
| 1147580 | 4/1969 | United Kingdom . |
| 1544155 | 4/1979 | United Kingdom . |

OTHER PUBLICATIONS

"Alcohols, Polyhydric," *Kirk–Othmer Encyclopedia of Chemical Technology*, 3rd Ed., vol. 1, pp. 754–789 (John Wiley & Sons, 1978).

Durkee Product Data Sheet IND-244F (Durkex 25 Vegetable Oil), 1 page, Aug. 1983 (SCM Durkee Industrial Foods, Cleveland, Ohio).

(List continued on next page.)

*Primary Examiner*—Steven Weinstein
*Attorney, Agent, or Firm*—Cedric M. Richeson

[57] ABSTRACT

A shirred tubular thermoplastic casing article of an ethylene polymer film with a substantially mineral oil-free liquid lubricating coating on the outside surface of the casing, and in contact with the ethylene polymer film, with preferred coatings being polyhydric alcohols such as 1, 2 propylene glycol or glycerine in water, or an aqueous dispersion of lecithin, and a method of manufacturing the article and method for making a processed foodstuff using the article.

15 Claims, No Drawings

OTHER PUBLICATIONS

"Mineral Oil, White", *Food Chemicals Codex*, 3rd Ed., pp. 199–200, (National Academy Press, 1981).

"Specification for Centrolex®F, Powdered Soybean Lecithin (Product Code 6450)", 1 page (Central Soya, Inc., Aug. 1, 1988).

"Specification for Centrolex ™ P, Granular Soybean Lecithin (Product Code 6420)", 1 page (Central Soya Co., Inc., Aug., 1988).

"The Lecithin Book", 15 pages (Central Soya Co., Inc., Dec., 1989).

"Lecithins As Emulsifiers", 5 pages (Central Soya Co., Inc., 1989).

English Abstract of JP-B-51 032 698 (Marudai Shokuhin) Sep. 15, 1976; Database WPI, Section Ch. Week 41, Derwent Publications Ltd., London GB.

English Abstract of JP-A-59 055 141 (Fujimori Kogyo) Mar. 30, 1984 Database WPI, Section Ch, Week 19, Derwent Publications Ltd., London GB.

METHOD FOR MAKING A COOKED FOOD USING SHIRRED CASING HAVING AN ETHYLENIC POLYMER OUTER LAYER WITH AN EXTERNAL NON-OIL BASED LUBRICANT

CROSS-REFERENCE TO RELATED APPLICATION

This application is a divisional application of pending application Ser. No. 07/584,563, filed Sep. 18, 1990 now U.S. Pat. No. 5,256,458 entitled "SHIRRED THERMOPLASTIC CASING HAVING EXTERNAL NON-OIL BASED LUBRICATING COATING" whose disclosure and teachings are hereby incorporated by reference in their entirety.

1. Field of the Invention

This invention relates generally to a shirred thermoplastic casing article comprising an ethylene polymer film, a method for manufacturing a shirred ethylene polymer film casing, and a method for manufacturing a processed food using a shirred casing of the ethylene polymer film type.

2. Background of the Invention

Ethylene polymer film-type thermoplastic casings are known in many forms. For example, the casing may be a monolayer film of ethylene vinyl acetate (EVA), or very low density polyethylene (VLDPE or ULDPE) or blends thereof, suitable for packaging poultry. Alternatively, the ethylene polymer may comprise the outer layer of a multilayer film wherein at least one additional oxygen barrier-type polymer layer is adhered to the inside surface of ethylene polymer outer layer. These oxygen barriers may, for example, be vinylidene chloride copolymers of the saran type, or ethylene vinyl alcohol, or nylon. Most commonly, at least one additional layer is adhered to the inside surface of the oxygen barrier type polymer for direct contact with the encased product, which may be, for example, a food such as meat. Frequently this innermost third layer is gas-tight sealable to itself as for example by heat sealing or mechanical clipping. The innermost layer is often an ethylene polymer film and in some instances identical to the outer layer.

For most efficient storage, handling and stuffing of such ethylene polymer film-type casing, these casings are manufactured in the shirred form, i.e., compressed and pleated. When the shirred casing is to be filled with food it is placed on a stuffing machine where it is deshirred, filled with food and closed at opposite ends for example by clipping. The food package may then be processed at elevated temperatures usually in a steam atmosphere to cook the encased meat, for example frankfurter emulsion. Alternatively, the food package such as ham may be immersed in a hot water bath for processing. Often the casing is removed from the processed food body by high speed peeling equipment.

It will be apparent from the foregoing that the ethylene polymer film type casing is subjected to frequent distortions and resultant stresses during several handling steps, i.e., shirring, stuffing and in some instances peeling. The casing also experiences considerable friction during these operations. For example, during stuffing the deshirring casing may be pulled through an external holdback device which continuously provides frictional contact.

Typical external holdback devices, stuffing methods and apparatus are disclosed e.g. in U.S. Pat. Nos. 3,748,690; 4,164,057; 4,649,602; and 4,766,713 which patents are hereby incorporated by reference in their entireties.

If the casing film is the multilayer type there may be a tendency for the film layers to delaminate, particularly if they are held together only by innerlayer adhesion developed during extrusion. For example, a multilayer film may be formed by simultaneously melting resin in separate flow paths and flowing them as parallel molten streams to the extruder discharge end for interlayer adhesion. Alternatively, the multilayer film may be formed by coating lamination wherein additional layers are consecutively formed by melting and deposition on a thermoplastic substrate layer. If during any of the shirring, deshirring, stuffing or peeling steps there is a tendency for the multilayer film to delaminate, these high speed operations may exacerbate such tendencies causing areas of delamination. Delaminated film is an esthetic defect and highly undesirable to customers. Also, it is believed there is a greater tendency toward breakage in areas of delamination, particularly where delamination occurs at creases in the casing caused by prior reeling of the casing in a flattened condition or by shirring. Furthermore, during peeling operations it is believed that delamination exacerbates the problem of detecting unpeeled portions or fragments of casing which may be undesirably and unintentionally left on the peeled foodstuff. Thus, the outer layer or layers of a casing may be removed during peeling, but a segment of delaminated inner layer adjacent a foodstuff surface such as a meat surface may not be peeled off or may not even be slit by the peeler.

In addition to these concerns about multilayer film delamination, there is a danger of film tearing or breakage due to the aforementioned manipulative stresses and friction. Torn or broken film is generally unsuitable for stuffing with foodstuffs such as meat emulsion or cheese and breakage during a stuffing operation leads to processing down time, waste and loss of production.

For these reasons it has been common practice to provide an external lubricant coating on the food casing surface for the shirring, deshirring and stuffing steps. Mineral oil is most frequently used and most commonly applied as an external spray or by brushing during the shirring operation e.g. by spraying or brushing the shirring rolls with lubricant prior to their contact with the casing whereupon the coating transfers to the casing surface. Most commonly these casings have been formed of cellulose, both nonreinforced and fiber paper reinforced. When used in this manner, mineral oil has been quite effective on cellulosic casing as a semipermanent lubricating film which would remain intact on cellulosic shirred sticks during long storage periods. As such, the mineral oil was available as an external film to perform its lubricating function when needed during the shirring, deshirring and stuffing operations.

Surprisingly, it has been discovered that an external coating of mineral oil on ethylene polymer type film casings is not entirely satisfactory even though commercially used. More particularly, there have been instances where multilayer film-type shirred casing sticks with an ethylene polymer outer layer have been partially delaminated when removed from shipping/storage cartons by the food processor for positioning in stuffing systems. This was unexpected because there was no evidence of delamination when packaged in the carton by the casing manufacturer.

There have been other reported instances where stuffed but uncooked meat pieces had small delamination blisters, primarily located near the end closure clips. Delamination, again near the clips, has been observed after cooking but before peeling, with mineral oil externally coated ethylene polymer external layers. Delamination during the peeling operation has also been observed.

It has also been observed with mineral oil-lubricated ethylene polymer type film casings that the latter do not always move smoothly through stuffing machines as for example the SHIRMATIC type manufactured and sold by Viskase Corporation.

One object of this invention is to provide a shirred thermoplastic ethylene film casing article affording improved shirring, stuffing and peeling performance.

Another object of the present invention is to provide an improved shirred multilayer thermoplastic casing article formed of ethylene polymer film which casing has improved resistance to delamination.

A further object is to provide an improved method of manufacturing a shirred thermoplastic casing formed of an ethylene polymer tube.

Still another object is to provide an improved method for manufacturing a processed food body employing such a shirred thermoplastic casing.

SUMMARY OF THE INVENTION

According to this invention a shirred tubular thermoplastic casing is provided comprising an ethylene polymer film with the tubular casing having an outside surface and an inside surface with a substantially mineral oil-free liquid coating on the casing outside surface with the coating being in contact with the ethylene polymer film. Preferably the casing will have a coating loading of at least about 1 g/m$^2$ and the coating will have a viscosity of at least about 2 and preferably at least about 15 centipoise. Preferably the coating is substantially free of mineral oil and more preferably substantially free from any and all oils including mineral oils, vegetable oils, animal oils or synthetically derived oils. More preferably the coating will be essentially free of mineral oil as well as any other oils and most preferably will have no oil contained therein. Preferred coatings may comprise polyhydric alcohols particularly dihydric alcohols such as propylene glycol or trihydric alcohols e.g. glycerine mixed with water. Also preferred are coatings such as a dispersion of lecithin in water. Fundamental to the present invention is use of a coating which resists diffusion into the interior of an ethylene polymer film. In a preferred embodiment the casing has at least two layers in direct adhering relationship comprising a polymeric inside layer as an oxygen-barrier and an ethylene polymer as an outer layer. Suitable oxygen barrier layers may comprise a polyamide, or ethylene vinyl alcohol, or blends thereof, or a vinylidene chloride copolymer.

The invention also includes a method of manufacturing a shirred thermoplastic casing article comprising the steps of providing an ethylene polymer tube and applying a substantially mineral oil-free liquid coating (which may comprise e.g. a polyhydric alcohol such as 1,2 propylene glycol, or glycerine, or an aqueous dispersion of lecithin) on the tube outer surface in an amount effective to facilitate stuffing, preferably at a loading of at least about 1 g/m$^2$ preferred coatings will have a viscosity of at least about 2, and preferably at least about 15 centipoise. The liquid-coated ethylene polymer tube is shirred to form the casing article.

The invention further includes a method for manufacturing a processed food body. This method includes the step of providing a shirred thermoplastic casing article comprising an ethylene polymer film with a substantially mineral oil-free liquid coating on the casing outside surface in a loading of at least about 1 g/m$^2$ preferably the coating has a viscosity of at least about 2 and more preferably at least about 15 centipoise. The coated casing is deshirred and stuffed with food such as meat emulsion to form a food package comprising a foodstuff encased by the casing article. The food package is processed e.g. by pasteurization or cooking and the casing is removed from the processed food body.

It will be apparent from the following description and examples that various embodiments of this invention achieve one or more of the aforedescribed objects or features thereof. Although not fully understood, the primary reason for the invention's substantial improvement over the prior art mineral oil-coated thermoplastic casing system is believed related to absorptivity of the liquid lubricating coating film into the casing wall. Whereas the mineral oil film is gradually absorbed into the ethylene polymer film wall with the passage of time and lost as an external lubricating film, the present invention employs mineral oil-free coatings such as a polyhydric alcohol or lecithin dispersion in a non-oil liquid carrier whereby the liquid lubricating coating film remains on the casing outer surface e.g. as small droplets and provides a semipermanent lubricating film which facilitates stuffing when using automatic stuffing equipment.

DETAILED DESCRIPTION

The invention in all of its embodiments employs a thermoplastic polymeric monolayer or multilayer film. Such films will preferably have a thickness of about 10 mils or less.

The term "polymer", "polymeric" and the like, as used herein, includes homopolymers, and copolymers such as bipolymers and terpolymers, and blends and modifications thereof.

The expression "ethylene polymer" as used herein, includes homopolymers of ethylene such as high density polyethylene (HDPE), and low density polyethylene (LDPE) and copolymers of ethylene, for example, with one or more alpha-olefins forming materials such as linear low density polyethylene (LLDPE) and very low density polyethylene (VLDPE). VLDPE may also be termed ultra low density polyethylene (ULDPE). Other suitable ethylene copolymers include copolymers of ethylene with vinyl esters or alkyl esters to form materials such as ethylene vinyl acetate and ethylene alkyl acrylates such as ethylene methyl acrylate and ethylene ethyl acrylate. Preferably, ethylene copolymers will contain at least about 80% and more preferably at least about 85% of its polymeric units derived from ethylene.

The term "oil" as used herein means an animal oil, vegetable oil, mineral oil, or synthetic equivalent thereof. Animal and vegetable oils are water-insoluble substances that are normally liquid at about 25° C. and which consist predominantly of glyceryl esters of fatty acids (triglycerides).

The term "mineral oil" as used herein means a water-insoluble mixture of refined liquid hydrocarbons which are essentially paraffinic and naphthenic in nature and obtained from petroleum. A detailed description of mineral oil is provided in *Food Chemicals Codex*, 3rd. Ed., pp. 199–200 (National Academy press, 1981) which description is hereby incorporated by reference.

The term "substantially free" with reference to oil or mineral oil (e.g. "substantially mineral oil-free" or "substantially oil-free") means that less than about 0.5 g/m$^2$ of oil or mineral oil is present. In preferred embodiments of the invention the amount of oil present, such as mineral oil, will be less than about 0.1 g/m$^2$, more preferably less than 0.05 g/m$^2$ of oil, and most preferably no mineral oil or any oil which is diffusible into the ethylene polymer containing layer will be present in the coating according to the invention. The term "essentially free" used with respect to oils (e.g. "essentially mineral oil-free" or "essentially oil-free") means that less than about 0.05 g/m$^2$ of oil is present.

The terms "polyhydric alcohol" and "polyol" as used herein mean an alcohol which contains two or more hydroxyl groups and includes dihydric alcohols such as the alkylene glycols, trihydric alcohols such as glycerol and alcohols with more than three hydroxyl groups such as the sugar alcohols having a general formula of HOCH$_2$(CHOH)$_n$CH$_2$OH, wherein n=2−5.

Suitable polyhydric alcohols for practicing this invention include glycols which are dihydric alcohols such as propylene glycol and 1,3 butylene glycol, trihydric alcohols such as glycerol (glycerine), and sugar alcohols such as xylitol or the hexitols including sorbitol and mannitol.

Also believed to be suitable for practicing the invention are liquid, preferably aqueous, coatings containing water-soluble sugars including mono- and di- saccharides such as fructose, dextrose, sucrose, maltose and lactose.

For ease of application the preferred polyhydric alcohols are liquid at ambient temperature. polyhydric alcohols are described in further detail in The Kirk-Othmer Encyclopedia of Chemical Technology, Third Edition, Volume 1, pages 754–789 (1978), which is incorporated herein by reference.

A preferred component of the inventive coating composition according to present invention is lecithin. Lecithin is a mixture of diglycerides of stearic, palmitic and oleic acids, linked to the choline ester of phosphoric acid. Most commercial lecithin is a mixture of naturally occurring phospholipids which are derived from soybeans. Typical soybean lecithin comprises the following acids with approximate percentages: palmitic (12%), stearic (4%), palmitoleic (9%); oleic (10%), linoleic (55%) linolenic (4%) and C$_{20}$ to C$_{22}$ acids including arachidonic (6%). Lecithin may act as a surfactant with both wetting and emulsifying properties. Lecithin is known to function as a release aid, dispersant, lubricant, softener and to control viscosity in various food industry applications. Lecithin is an amphoteric emulsifier. As used herein, the term "lecithin" includes both unsubstituted lecithin and substituted lecithin which has been modified by chemical means. Suitable lecithin is commercially available from Central Soya Co., Inc. of Fort Wayne, Ind. under the brand designations Centrolex-P 6420 and Centrolex-F 6450. Centrolex-P 6420 is commercially available as a food grade, essentially nonoil-containing, water dispersible and oil soluble granular soybean-derived lecithin having a minimum of about 97% of acetone insoluble phospholipids. Centrolex-F 6450 is commercially available as a food grade essentially non-oil containing, water dispersible and oil-soluble powdered soybean-derived lecithin having a minimum of about 95% acetone insoluble phospholipids and having an HLB value of about 7. Centrolex-P 6420 and Centrolex-F 6450 are further described in product brochures from Central Soya respectively entitled "Specification for Centrolex TM P, Granular Soybean Lecithin (Product Code 6420)" (Aug. 1, 1988) and "Specification for Centrolex ®F, powdered Soybean Lecithin (Product Code 6450)" (Aug. 1, 1988). These two brochures and a booklet entitled "The Lecithin Book" (Dec., 1989, Central Soya Co., Inc.) which describes lecithin, its properties and uses are hereby incorporated by reference in their entireties.

The amount of the liquid lubricating coating present on the surface of the casing may vary over a wide range. In general, the preferred tubular casings of the present invention will contain an amount of coating sufficient to provide adequate lubrication during contact with a holdback device (also termed a "casing brake" or "skin brake") during stuffing of the casing with a foodstuff such as meat emulsion to enable or facilitate production of a tubular encased product having a substantially uniform diameter without undue breakage. Also, sufficient lubrication should be provided during contact with shirring rolls or equipment to prevent breakage or tearing of the casing.

The concentration (loading) of liquid coating, such as polyhydric alcohol, lecithin dispersions or sugar solutions, on the ethylene polymer film outer surface should be at least 1 g/m$^2$ to insure that its thickness is sufficient to provide adequate lubrication between the shirring, stuffing and peeling machines' contact surfaces and the casing outer wall. The loading is preferably at least 2 g/m$^2$ and will beneficially be between about 1 g/m$^2$ and 8 g/m$^2$; higher loadings are unnecessary and may result in excessive slippage between the casing outer surface and the mechanical contact members. In some embodiments of the invention the loading may advantageously be at least about 4 g/m$^2$. These loading levels refer to total coating weight and include e.g. solvents or carrier liquids such as water. With respect to lecithin the preferred amounts of lecithin will be at least 0.03 g/m$^2$ and more preferably at least about 0.1 g/m$^2$ and most preferably between about 0.2 and 0.8 g/m$^2$. The lecithin will typically be applied to the casing as a dispersion in a liquid such as water of propylene glycol. For example, 4 g/m$^2$ of a liquid lubricating coating having 0.24 g/m$^2$ of lecithin dispersed therein may be applied to an outer surface of a casing.

The loadings described herein refer to the as-applied values, it being recognized that the initial liquid film tends to coalesce into droplets or beads with the passage of time. These droplets are spread out on the ethylene polymer surface during the aforementioned mechanical contact operations.

The lubricating coating may be applied to the ethylene polymer outer surface of the casing by any of several convenient methods well-known to those skilled in the art. These include blotting, brushing, dip rolling, or spraying by means of gas propellant such as air. It is preferred to apply the coating to the shirring rolls for contact transfer to the casing surface during shirring.

The lubricating coating on the casing outer surface typically will have a viscosity of at least about 2 centipoise. For some types of shirring operations higher coating viscosities e.g. at least about 15 cps are necessary for the coating to provide a continuous lubricating film between the casing outer surface and the shirring rolls thereby preventing seizure and breakage of the casing during shirring. As used herein, viscosity values of liquid systems are based on measurements using a Model LVT apparatus manufactured by Brookfield Engineering Laboratories, Inc. of Stoughton, Mass., using a No. 1 spindle rotated at 30 rpm. Measurements are at about 22.5° C.

Those skilled in the art may readily determine the viscosity of liquid based solutions, dispersions and mixtures such as polyhydric alcohols, lecithin dispersed in a liquid carrier and sugar solutions. Pure liquid solutions or aqueous mixtures or dispersions are preferred. The following values have been measured for certain liquid based systems.

TABLE A

Coating Solution Viscosities

| Description | Centipoise, CPS |
| --- | --- |
| 40% glycerine/60% water | 9 |
| 50% glycerine/50% water | 11 |
| 60% glycerine/40% water | 12 |
| 70% glycerine/30% water | 20 |
| 75% glycerine/25% water | 35 |
| 3% lecithin/97% water | 11 |
| 4% lecithin/96% water | 16 |
| 5% lecithin/95% water | 20 |
| 6% lecithin/94% water | 28 |
| 7% lecithin/93% water | 36 |
| 9.35% lecithin/90.65% water | 121 |
| 100% mineral oil | 27 |
| 100% 1,2 propylene glycol | 39 |

It will be apparent from the ensuing samples that coatings of glycerine with concentrations having very low viscosities provide a film outer layer having sufficient lubrication for shirring and/or stuffing a thermoplastic film casing of the ethylene polymer type. Suitable lubricating coatings or films typically have a viscosity of at least about 15 centipoise and preferably at least about 20. In one preferred embodiment, the viscosity of the liquid coating is at least about 30 centipoise. Highly viscous coatings in which the viscous drag forces interfere with smooth passage of casing through a stuffing machine are not preferred. Similarly, for some types of shirring highly viscous coatings may cause shirring rolls to produce irregular pleat formation with possible shirring damage to the casing and/or excessive wear on the shirring rolls. Coatings with too low of a viscosity have a tendency toward nonuniformity in coating of the casing surface.

EXAMPLE 1

A series of tests were conducted to determine the relative delamination of multilayer films having been coated with various solutions. To accelerate the tests, they were conducted at substantially above ambient temperature, i.e., 120° F. In each instance the film was in the form of flexible tubes of about 8½ inches flat width, comprising three layer film manufactured by Viskase Corporation and of the type commercially designated as PERFLEX 70. These tubes were prepared by coextrusion and biaxial orientation as for example generally described in Pahlke et al U.S. Pat. No. 3,456,044 to provide heat shrinkability. The approximately 1.7 mil thick inner layer was 100% ethylene vinyl acetate (EVA) with a vinyl acetate content of 10 wt % and melt index of 0.25 (prepared from Union Carbide Corporation resin DQDA 6833). The barrier-core layer was an approximately 0.3 mil thick layer formed of a blend comprising vinylidene chloride-vinyl chloride copolymer and vinylidene chloride-methyl acrylate copolymer. The methyl acrylate comprised about 7.2 wt % of the blend. The outer layer was formed from a blend of 75 wt % ultra low density polyethylene of 0.912 g/cm$^3$ density having a melt index of 1.0 and 25 wt % EVA having a vinyl acetate content of 12 wt % and melt index of 0.25 (prepared from Dow Chemical Company ULDPE resin available under the brand designation Attane 4001 and Dupont EVA resin available under the brand designation Elvax 3135X). The outer layer had a thickness of about 0.8 mil, providing a total film thickness of about 2.8 mils. For all samples, about 12 gms/1000 ft$^2$ of film surface area of Oxy Dry C-5 corn starch powder (manufactured by Oxy Dry Corporation) was applied to the hot inside surface of the inner layer through the extrusion die as a substantially uniform dispersion of particles having major dimensions of about 15 microns particle size. After biaxial orientation the film was irradiated to a dosage of about 4 MR in accordance with the broad teachings of Lustig et al U.S. Pat. No. 4,737,391.

Twelve film samples were tested with the various coating solutions being substantially uniformly applied to the outside surface of Samples 2–12 by a towel moistened with coating solution in an estimated loading of about 4 gm/m$^2$. Sample 1 was a control sample (not of the invention) and was not coated.

An accelerated delamination test was conducted on the above film having the coating solutions indicated in Table B applied to the exterior film surface.

A sample of each coated film was obtained by transversely cutting a 16 inch long section at right angles to the axis of the tube to provide a coated casing sample for delamination testing. The samples were placed in an oven set at about 120° F. for the period indicated in Table B. The film samples were visually checked initially and periodically for signs of delamination. The test was terminated if the sample exhibited both edge and body delamination. Delamination was evaluated visually on the basis of the following qualitative ratings: 0 (no delamination), 1 (very slight edge delamination), 2 (slight edge delamination), 3 (slight edge delamination; occasional small blister), and 4 (edge and body delamination). The results of these accelerated delamination first series tests are summarized in Table B.

TABLE B

Accelerated Delamination First Series

| Sample No. | Coating Solution (by wt.) | Delamination Rating | Test Days |
| --- | --- | --- | --- |
| 1 | control (no coating) | 3 | 5 |
| 2 | 100% mineral oil | 4 | 1 |
| 3 | 80% glycerine/20% water | 3 | 5 |
| 4 | 50% glycerine/50% water | 2 | 5 |
| 5 | 20% glycerine/80% water | 2 | 5 |
| 6 | 80% PG$^{(a)}$/20% water | 3 | 5 |
| 7 | 50% PG/50% water | 2 | 5 |
| 8 | 20% PG/80% water | 2 | 5 |
| 9 | 100% polyethylene glycol$^{(b)}$ | 4 | 1 |
| 10 | 3% lecithin$^{(d)}$/97% water | 1 | 5 |
| 11 | 100% soybean oil$^{(c)}$ | 4 | 1 |
| 12 | lecithin in vegetable oil$^{(e)}$ | 4 | 1 |

$^{(a)}$1,2 propylene glycol
$^{(b)}$reported average molecular weight is 200
$^{(c)}$Durkex 25, from Durkee Industrial Foods, is partially hydrogenated soybean oil with oxystearin, and butylated hydroxyanisole (BHA) added.
$^{(d)}$Centrolex-F 6450 (food grade), from Central Soya Corporation
$^{(e)}$Centrophil-M 6308, from Central Soya Corporation, is lecithin in vegetable oil containing coconut oil, cottonseed oil, and small amounts of propylene glycol, BHA and citric acid.

Based on Table B, sample 10 (3% lecithin-97% water) exhibited the best results because it appeared to suppress delamination compared to the control sample 1 (no coating) or mineral oil coated sample 2. No more than 50glycerine-no less than 50% water (samples 4 and 5) and no more than 50% propylene glycol-no less than 50% water (samples 7 and 8) coatings allow only slight delamination at the casing edges. Mineral oil, polyethylene glycol, soybean oil and lecithin in vegetable oil (samples 1, 9, 11 and 12 respectively) all caused substantial edge and body delamination after only one day.

EXAMPLE 2

A second series of accelerated delamination tests were conducted using three different solution coatings on four different types of multilayer films., These films included W. R. Grace Cryovac Division's type CN-510. This is an approximately 3.5 mil thick film having an inner ionomer layer and probably comprising a total of six layers as generally described in U.S. Pat. No. 4,469,742. The individual layers are probably as follows: ionomer (inner)/EVA/adhesive/EVOH/adhesive/EVA (outer). Another type of multilayer film used in this Example 2 is the aforedescribed PERFLEX 70. Still another type was inverted PERFLEX 70, so that the outer layer became 100% EVA with a vinyl acetate content of 10 wt %.

A further type of multilayer film used in this Example 2 was Viskase Corporation's PERFLEX 52 HP. This film differed from the aforedescribed PERFLEX 70 by having an inner layer identical to the outer layer, i.e. 75% ultra low density polyethylene-25% EVA blend. This film, designated herein as PERFLEX 52 Hp, was manufactured by the same coextrusion-biaxial orientation method as the film designated herein as PERFLEX 70.

In these tests the coatings were also substantially uniformly applied to the casing outer surface by a towel moistened with the coating solution and the actual loading was determined by weight differential. All films were prepared for testing by cutting 18 inch lengths of tubing normal to the longitudinal axis of the tubular film which were then placed in an oven set at about 120° F. In this example, films having various flat widths were used with the p 70 being about 9½ inches, the inverted p 70 being about 11¼ inches, the P52HP being about 11⅝, and the CN-510 being about 12¼ inches.

The test was conducted with all of the samples 13-21 at elevated temperatures for 14 days. In Table C, the column designated "test day" indicates the number of days following insertion of the sample into the oven at which the sample reached its maximum degree of delamination over the 14 day period of the test. The second series delamination test results from Example 2 are summarized in Table C.

TABLE C

| | | Accelerated Delamination Second Tests[a] | | | | |
|---|---|---|---|---|---|---|
| Sample No. | Coating (by wt.) | Cryovac CN-510 | P 70 | Inverted P 70 | P52HP | Test Day |
| 13 | mineral oil | 0 (19.94) | | | | 1 |
| 14 | mineral oil | | 4 (37.25) | | | 3 |
| 15 | mineral oil | | | 3 (14.52) | | 1 |
| 16 | mineral oil | | | | 4 (13.25) | 3 |
| 17 | 70% glycerine/30% water | 0 (30.23) | | | | 1 |
| 18 | 70% glycerine/30% water | | 1 (30.70) | | | 1 |
| 19 | 70% glycerine/30% water | | | 2 (29.37) | | 1 |
| 20 | 70% glycerine/30% water | | | | 2 (29.96) | 1 |
| 21 | 70% sorbitol/30% water | | 1 (8.97) | | | 1 |

[a]For each sample under each film type, the first number is the delamination rating; second number in parenthesis is the coating loading in gms/m².

The delamination test was performed under severe temperature conditions and all samples reached their maximum degree of delamination by the third day following the start of the 14 day test. The samples were inspected and rated at 1, 3, 4, 7 and 14 days after placement in a heated oven. Inspection of Table C shows that Cryovac film type CN-510 experienced no significant delamination with either mineral oil (sample 13) or 70% glycerine-30% water coatings (sample 17) coating. It is believed without wishing to be bound by that belief that this was probably due either to use of an adhesive layer between the EVA outer layer and the EVOH barrier layer in this six layer film which adhesive layer produced an oil resistant bond bridging the outer layer and the core layer, or that the mineral oil was absorbed by the EVA outer layer but probably did not penetrate at least one of the adhesive layer or the EVOH layer (most probably did not penetrate the EVOH layer) and therefore the lack of penetration by the oil prevented delamination. In contrast, the mineral oil coating penetrated the EVA or VLDPE/EVA blend outer layer of the other three types of film and either because there was no adhesive layer or because the core layer was an oil-penetrable saran-type layer, delamination of the outer layer from the barrier layer occurred (samples 14-16).

However, with the 70% glycerine-30% water, or the 70% sorbitol-30% water coatings, it is believed that there was substantially no penetration of the EVA and VLDPE/EVA blend outer layers or core layers by these coatings and therefore substantially no delamination.

The conclusion from Example 2 is that with oil-free, water-soluble coating such as polyhydric alcohol liquid coatings or films in accordance with this invention, high resistance to delamination is obtained with three layer films containing an oxygen barrier layer especially of the saran-type wherein the layers are directly adhered to each other (without the necessity of an adhesive layer). This delamination resistance is equivalent to that of more expensive six layer films wherein the outer and intermediate layers are tied together by an adhesive. Another conclusion from Example 2 is that films made by a coextrusion type process and having a lubricating coating may be made more resistance to delamination by replacing oil-containing coatings with a diffusion resistant coating which will typically be a water-soluble, oil-free coating.

EXAMPLE 3

A series of tests were performed in which the most promising casing articles from the Examples 1 and 2 delamination tests were used in shirring trials, then deshirred and stuffed with chunked and formed ham to form food packages. The latter were steam processed and the casing removed from the processed foodstuffs.

More specifically, the Example 3 casings were the aforedescribed PERFLEX 70 type in a 9½ inch flat width. The outside coatings were applied by contact with spray coated shirring rolls were 100% mineral oil (sample 22), a 50% glycerine/50% water mixture (sample 23), a 70% glycerine/30% water mixture (sample 24) and a 3% lecithin/97% water dispersion (sample 25). The coating loadings were each in the range of about 2–4 gms/m².

Samples 22 and 24 were successfully shirred on conventional commercial equipment to a pack ratio of about 100:1 of its original length. The shirred sticks were uniform, straight and considered to be commercially acceptable.

Surprisingly, the 3% lecithin (viscosity of about 11 cps) coated sample 25 (the best performer in the aforedescribed delamination tests) could not be properly shirred on the same equipment because the lecithin did not provide good lubrication resulting in non-uniform tension which caused excessive vibration of the casing and shirring mandrel during shirring. The resulting sample 25 shirred sticks were deformed and distorted.

The 50% glycerine/50% water coated sample 23 was more easily shirred than lecithin sample 25 so the glycerine-water coating provided somewhat better shirring lubrication. Accordingly, sample 23 with a coating viscosity of about 11 centipoise in the amount applied was considered fair for commercial use. These results are summarized in Table D.

TABLE D

| | Shirring Screening Tests | | |
|---|---|---|---|
| Sample No. | Coating (by wt.) | Coating Viscosity (cp.) | Shirring Performance |
| 22 | Mineral Oil | 27 | good |
| 23 | 50% glycerine/ 50% water | 11 | fair |
| 24 | 70% glycerine/ 50% water | 20 | good |
| 25 | 3% lecithin/ 97% water | 11 | poor |

Casings coated with 50% glycerine or 3% lecithin in water (samples 23 and 25) did not shirr as well as control sample 22 which utilized mineral oil or sample 24 having 70% glycerine in water. It is believed that the lower viscosity coatings utilized in samples 23 and 25 did not provide a continuous coating on the film due to the method of applying the coating via contact with the shirring rolls. It is believed that when the lubricating coating does not provide a continuous layer between the casing and machinery contact points, the desired smooth running of casing through machinery is not obtained. This data indicates that application techniques and quantities applied to the surface should be adequate to yield a continuous, lubricating film of liquid. Improved or different shirring results may be obtained on different shirring equipment or possibly by use of greater loadings or increased viscosities.

A stuffing test was conducted about 5 weeks after the above-described shirring tests. Six casing articles of each sample 22 and 24 were stuffed with chunked and formed ham product using a machine of a commercially employed type, the SHIRMATIC 600A system manufactured by Viskase Corporation. This basic stuffing system is described in Kupcikevicius U.S. Reissue No. 30,390 as modified by the description in Raudys U.S. Pat. No. 4,683,617 so that a tubular core member supports the shirred casing stick and becomes the machine tension sleeve. The stuffing results were comparable for the two types of casings. No apparent delamination was noted at the time of stuffing. It was observed that the 70% glycerine/30% water shirred casing articles had small droplets on the outer surface prior to stuffing but no residue remained after processing.

The stuffed food packages were steam processed in a Jordan Cooker for one hour at 145° F., then for 1½ hours at 155° F. and finally at 180° F. until reaching an internal temperature of at least 155° F., and then water cooled. After processing, two small areas of delamination (less than 10 mm²) were observed on one (out of 6 casings) of the mineral oil-coated type casing. This was associated with an abraded area of the film.

The casings were stripped by hand from the foodstuff. During this stripping there was a separation of the outer ethylene polymer layer for all casings of both sample types. The separation was easier to initiate when the film was torn rather than cut along a straight line. Food product-casing adhesion and liquid accumulation in pockets therebetween (termed "purge" by those skilled in the art) were about equal for both sample types.

This Example 3 demonstrates that the inventive system is at least functionally equivalent to the commercially employed mineral oil outer coated ethylene polymer tubular casing system.

EXAMPLE 4

This invention is also applicable to monolayer thermoplastic casing articles formed of ethylene polymer film, and the following tests of this Example 4 demonstrate superior stuffing performance with polyhydric alcohol outer coatings in accordance with the invention, compared to the commercially employed mineral oil coating.

More specifically in these tests, the film comprised 75 wt % ultra low density polyethylene of the aforedescribed Attane 4001 type and 25 wt % EVA of the aforedescribed Elvax 3135X type. A tubular film was extruded and biaxially stretched by the previously referenced double bubble method and then irradiated at a dosage level of about either 3 or 4 megarads (MR). The 8 inch flat width films were about 2.3 mils thick and coatings were applied to the external surface by contact transfer from the shirring rolls (which were sprayed with either mineral oil or 70/30 glycerine/water). The coating levels were estimated to be about 2–4 g/m² and the so-coated casings were shirred to a pack ratio of about 100:1. The results of testing samples 26–29 are summarized in Table E.

TABLE E

Monolayer Casing Article

| Sample No. | Coating (by wt.) | Coating Viscosity (Centipoise) | Irradiation (MR) |
|---|---|---|---|
| 26 | 100% mineral oil | 27 | 3 |
| 27 | 100% mineral oil | 27 | 4 |
| 28 | 70% glycerine/30% water | 20 | 3 |
| 29 | 70% glycerine/30% water | 20 | 4 |

After a storage period of about 26 days, shirred casing samples 26-29 were used in stuffing and cooking trials. The stuffing machine was a Viskase SHIRMATIC type 600A. The stuffed food was pork pizza topping containing about 2% by weight of soy isolate (a soy protein concentrate), and stuffed samples were steam cooked at 170° F. until the internal temperature reached at least 155° F.

Mineral oil-coated samples 26 and 27 did not properly stuff and resultant encased foodstuffs were of nonuniform lengths and diameters. During the externally coated shirred monolayer ethylene polymer tubular casing storage period, the mineral oil apparently diffused into the film wall leaving the surface with an inadequate amount of lubricating coating. The outer surface of these casings felt extremely dry to touch and relative to freshly coated casing. The absence of a sufficient lubricating film on the casing surface caused the casing and encased foodstuff to move erratically through the frictional holdback device and off the machine conveyor, resulting in inconsistent package lengths and circumference. The stuffed food packages of samples 26 and 27 were considered unacceptable for commercial use.

In contrast, the 70% glycerine/30% water coated samples 28 and 29 each stuffed to produce encased food packages having a consistent circumference and diameter. The 3 MR irradiated sample 28 produced encased foodstuffs having a smaller diameter and circumference than the 4 MR irradiated sample 29 when both were measured at the same distance from the pressure ring.

EXAMPLE 5

In Examples 1-4, the polyhydric alcohol coating on the ethylene polymer film casing outside surface was either glycerine-aqueous mixture or sorbitol. This Example 5 demonstrates that dihydric polyhydric alcohols may be used in the practice of this invention, for example 1,2 propylene glycol. More particularly, this example shows that a 100% 1,2 propylene glycol coating provides superior chunked ham stuffing/cooking performance to a commercially employed 100% mineral oil coating. The casing was the previously described multilayer film designated PERFLEX 70 having a flat width of about 8.4 inches and irradiated after biaxial stretching to a dosage level of about 4 MR.

In these tests the mineral oil and 1,2 propylene glycol was applied to similar casings by contact with coated shirring rolls to produce casing loadings estimated at about 2-4 gm,/m², and each casing was shirred to a pack ratio of about 100:1 to form samples 30-33. When the casings were visually inspected immediately prior to stuffing, sample 30 which was previously coated with mineral oil had no visual evidence of the externally applied lubricant and was dry to touch. This was about 13 days after the mineral oil film application and shirring. In contrast, the propylene glycol coated samples 31-33 had distinct droplets of lubricant on the outside surface and as such was wet to the touch compared to the mineral oil coated sample 30.

A Viskase SHIRMATIC type 600A system was used to stuff samples 30 and 32. An encased product stuffing circumference was targeted at 17⅝ inches. It was not possible to attain the target circumference with sample 30. This was believed due to poor external surface lubrication caused by diffusion of the oily coating into the ethylene polymer film. Four identical pieces of sample 30 were stuffed to an average circumference of 17.57 inches. Attempts to increase to the target circumference were unsuccessful due to consistent loss of the "pre-tie" (front end) clips. It was observed that the casing wall folded across the back of the sizing disk, essentially locking the casing onto the disk. Tightening of the pre-tie clips did not overcome this excessive holdback. This phenomenon was not experienced with the propylene glycol coated sample 31.

At the same ¾ inch gap between the sizing disk and the face place used with mineral oil coated sample 30, the propylene glycol coated sample 31 stuffed to a smaller circumference averaging 17.39 inches. However, when the sizing disk-face plate gap was reduced to 7/16 inches, this casing (sample 32) attained about the same stuffed diameter as the mineral oil coated sample 30. Further reduction in gap allowed overstuffing to an average circumference of 18.44 inches (sample 33). From these tests it was clear that the propylene glycol coated sample 31 had a wider stuffing range than the mineral oil coated sample 30.

Samples 30 and 32 were steamed cooked under similar conditions and afterwards both samples had a similar increase in circumference whereas the mineral oil treated sample 30 had a slightly greater reduction in length (−0.8% vs −0.1%). purge losses (loss of liquid from the cooked product) through cooking were about the same. The data from this Example 5 is summarized in Table F.

TABLE F

Propylene Glycol Coating

| Sample No. | Gap (in.) | Stuffed Circumference (in.) | Cooked Circumference (in.) | Purge Loss (wt %) |
|---|---|---|---|---|
| 30* | 0.75 | 17.57 | 18.21 | 0.35 |
| 31 | 0.75 | 17.39 | — | — |
| 32 | 0.41 | 17.53 | 18.10 | 0.33 |
| 33 | 0.31 | 18.44 | — | — |

*Sample 30 was a mineral oil control sample.

Example 5 demonstrates superiority of the propylene glycol coated embodiment of the invention over the prior art mineral oil coated system.

EXAMPLE 6

Aqueous dispersions of essentially non-oil-containing lecithin at various concentrations were coated on Viskase PERFLEX 70-type casing having a film construction as described above by contact during shirring with spray coated shirring rolls having a nominal addition rate of about 4 g/m². Mineral oil, various mixtures of glycerine in water and also 1,2 propylene glycol were also coated on similar casing and for all these samples the amount retained by the shirred casing was calculated by measuring the weight of a known area of casing before and after coating application. The amount of retained coating in g/m² is reported below in Table 6 for the various types of coating along with the respective viscosities of the coatings and the observed evaluation of shirrability of casings coated with each type and amount of coating.

TABLE G

| Sample No. | Coating (wt. %) | Viscosity (cps) | Coating Retained Amount (g/m$^2$) | Shirrability |
|---|---|---|---|---|
| 34 | lecithin 3%* | 11 | N.D. | poor |
| 35 | lecithin 6%* | 26 | 1.53 | good |
| 36 | lecithin 9.35%** | 121 | 2.05 | good |
| 37 | PG 100% | 39 | 3.99 | good |
| 38 | glycerine 40%** | 9 | 2.05 | fair |
| 39 | mineral oil 100% | 27 | 3.63 | good |

*Balance deionized water
**Balance tap water
N.D. = Not determined

It was observed that for sample 34, the low viscosity 3% lecithin coating had a high degree of run off from the casing during application and it is believed that an insufficient amount of coating was present on the casing surface for acceptable shirring by the method employed. Also, additional experiments indicate that use of tap water containing multivalent ions tends to decrease the viscosity of lecithin dispersion relative to compositions containing an equal amount of lecithin dispersed in deionized water.

EXAMPLE 7

Respective samples of multilayer casings of the previously described PERFLEX 70 type having a 7½ inch flat width were coated on their exterior surfaces with mineral oil, propylene glycol, and a 70% solution of glycerine in water by coating applied via shirring rolls during shirring and their performance evaluated during stuffing. These casings, having a nominal flat width of 7½ inches were stuffed with a pumpable meat preparation using a Viskase SHIRMATIC 600A stuffing machine.

The casings, prior to stuffing were different in appearance and to the touch. The mineral oil treated casing was dry with no discernible visual or tactile evidence that a lubricant was present on the surface. Both polyol treated casings had visible droplets of liquid on the surface and were moist and slippery to the touch.

In the stuffing process the mineral oil casing stuffed poorly and it was not possible to stuff to a consistent diameter. Water was applied to the mineral oil lubricated casing surface just prior to stuffing, which improved production of encased foodstuff with greater uniformity and consistency of the stuffed diameter. The two polyol coated casing samples processed smoothly through the stuffing machine and yielded uncooked encased foodstuffs having uniformly consistent stuffed diameters. The results are summarized in the Table H below.

remain on the surface in sufficient amounts to facilitate stuffing. The inventive coated casings have desirably low friction between the casing and contact surface with the stuffing machine holdback device.

The mineral oil of casing samples 40–41 is believed to have diffused into the casing after shirring and was not present on the outer surface of the casing in an amount sufficient to act as a lubricant during the subsequent stuffing step.

The polyols have a distinct advantage compared to mineral oil for the stuffing process in that they did not require adding water to the casing as it deshirrs just prior to stuffing. Such water addition is typical in the art for mineral oil treated plastic casings and has the disadvantage of requiring additional equipment to provide and remove the water (with post removal treatment and/or disposal) as well presenting the possibility of undesirable bacterial contamination and growth, necessitating the cleaning and maintaining of additional equipment to prevent growth and harboring of dangerous food spoilage or pathogenic bacteria such as Listeria or Salmonella.

EXAMPLE 8

In this example the effect of various external lubricating coatings on ink adhesion to ethylene polymer casings was tested. Thermoplastic film of the previously described PERFLEX 70 type having an ethylene-type outer layer were printed by means of a flexo hand proofer with approximately 2 by 10 inch strips of red and white pigmented polyamidenitrocellulose (PNC) inks. The surface printed films were printed first with white, dried with a hot air, hand-held heat gun to evaporate the solvent and overprinted with the red ink in an offset fashion to provide printed areas of white only, red only and red over white, and then again dried as described above. Samples of these printed films were then coated by smearing the ink coated surface with 100% mineral oil, 70% glycerine mixed with 30% water, and 100% 1,2 propylene glycol respectively. The coatings were liberally applied by swabbing with a lubricant coated swab. The samples were folded to provide coated face to coated face contact as well as coated face to uncoated back contact, and then wrapped in aluminum foil and placed in an oven (set at about 120° F.) for 24 hours on a flat surface under an approximately 20 lb. flat weight over a 2 by 2 inch area.

At the end of 24 hours the samples were taken out of the oven, allowed to cool down to the ambient temperature and examined for any kind of ink failure due to chemical attack. The results are summarized in Table I below:

TABLE H

| Sample No. | Lubricant | No. of Shirred Articles Stuffed | Casing Stuffed Diameter (inches) | Std Dev | Uniformity of Stuffed Casing Diameter |
|---|---|---|---|---|---|
| 40 | 100% mineral oil | 13 | 5.182 | 0.108 | poor consistency |
| 41* | 100% mineral oil | 16 | 5.029 | 0.057 | good consistency |
| 42 | 100% propylene glycol | 53 | 5.070 | 0.066 | good consistency |
| 43 | 70% glycerine/30% water | 63 | 5.056 | 0.059 | good consistency |

*Water applied to surface just prior to stuffing.

These tests indicate that casings coated with polyols do not deleteriously diffuse into the casing but rather

TABLE I

| Sample No. | Coating | Blocking | Ink Offset | Fingernail Scratch Test |
|---|---|---|---|---|
| 44 | 100% mineral oil | none | slight | severe |
| 45 | 100% propylene glycol | none | slight | severe |
| 46 | 70% glycerine* | none | none | very slight |

*Balance water

All of the folded films were easily separated by hand with no tearing due to blocking. Separation of the coated face to uncoated back for samples 44 and 45 evidenced a slight offset of the inks from the coated face to the uncoated back for the white ink only. Sample 46 did not offset. The coated surfaces were also scratched vigorously with a fingernail and both red and white inks came off easily for the samples 44 and 45 treated with mineral oil and propylene glycol (PG) respectively. In sample 46 the casing coated with glycerine only had a slight removal of the red ink only in the scratch test. The above tests surprisingly indicate that a glycerine coated casing has greatly superior ink adhesion for ethylene polymer films printed with a typical organic solvent based thermoplastic flexographic ink such as PNC inks.

While certain embodiments of this invention have been disclosed hereinabove, those skilled in the art appreciate that changes and modifications may be made therein without departing from the spirit and scope of the invention.

We claim:

1. A method for manufacturing a processed food comprising the steps of:
    (a) providing a shirred thermoplastic casing comprising an ethylene polymer film having a substantially oil-free liquid coating on the casing outside surface and in contact with said ethylene polymer film in a loading of at least about 1 g/m$^2$, based on the total coating weight, and having a viscosity of at least about 2 centipoise wherein said coating comprises a lubricant wherein said lubricant is selected from the group consisting of lecithin, a polyol, a water-soluble sugar, or mixtures thereof;
    (b) deshirring said casing and stuffing processable food therein to form a food package comprising a foodstuff inside said casing;
    (c) thermally processing said food package; and
    (d) removing said casing from the thermally processed foodstuff, said coating comprising said lubricant being present in an amount sufficient to provide adequate lubrication of said casing outer wall during manufacture of said processed food sufficient to prevent breakage or tearing of said casing.

2. A method as defined in claim 1 wherein said casing is biaxially oriented and heat shrinkable and shrinks against said foodstuff during said manufacturing of said processed food.

3. A method as defined in claim 1 wherein said casing comprises a tubular multilayer film wherein said ethylene polymer film comprises an outer layer and said multilayer film further comprises at least one additional inner layer.

4. A method as defined in claim 3 wherein said outer layer and said inner layer are coextruded.

5. A method as defined in claim 4 wherein said inner layer is heat sealable to itself and said multilayer film comprises a core layer which is an oxygen barrier.

6. A method as defined in claim 5 wherein said multilayer film consists essentially of three coextruded thermoplastic film layers.

7. A method as defined in claim 3 wherein said ethylene polymer comprises a homopolymer of ethylene.

8. A method as defined in claim 3 wherein said ethylene polymer comprises a copolymer of ethylene and a member selected from the group consisting of a vinyl ester, an alkyl ester, or one or more alpha-olefins.

9. A method as defined in claim 1 wherein said coating is essentially oil-free.

10. A method as defined in claim 1 wherein said lubricant comprises lecithin.

11. A method as defined in claim 1 wherein said lubricant comprises glycerine.

12. A method as defined in claim 1 wherein said deshirring and stuffing step is performed without adding water to the outer surface of the casing as it deshirrs just prior to stuffing.

13. A method as defined in claim 1 wherein said processable food comprises meat.

14. A method as defined in claim 1 wherein said processable food comprises pork.

15. A method as defined in claim 1 wherein said coating further comprises an aqueous carrier for said lubricant.

* * * * *